Patented Dec. 5, 1933

1,938,054

UNITED STATES PATENT OFFICE 1,938,054

INDIGOID DYESTUFF

Norbert Steiger, Frankfort-on-the-Main, and Walter Brunner, Frankfort - on - the - Main - Fechenheim, Germany, assignors to General Aniline Works, Inc., New York, N. Y., a corporation of Delaware No Drawing. Application January 6, 1933, Serial No. 650,579, and in Germany January 11, 1932

5 Claims. (Cl. 260—48)

The present invention relates to indigoid dyestuffs, more particularly to those corresponding to the general formula

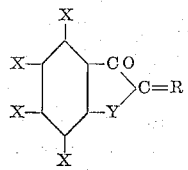

(wherein two X mean methyl, the third X an alkoxy-group, the fourth X hydrogen or halogen, Y means S or NH and R a radical of a hydroxy-thionaphthene or an isatine of the benzene or naphthalene series which may contain as substituents alkyl, alkoxy or halogen).

The either component of these dyestuffs (left in the above formula) belongs in any case to the group of indigoid dyestuff components described in our U. S. applications Ser. No. 650,578, relating to "Hydroxy-thionaphthene compounds" (throughout the specification numbered for the sake of brevity I), and Ser. No. 650,580, relating to "Isatine compounds" (throughout the specification numbered for the sake of brevity II), both filed on the same date.

The process of making symmetrical dyestuffs of this kind is by oxidizing the hydroxy-thionaphthenes of our U. S. application Ser. No. 650578 (I). Asymmetrical dyestuffs are obtained by condensing the same hydroxy-thionaphthenes with an isatine or a reactive α-derivative of this isatine or of a 2.3-diketo-dihydro-thionaphthene, these components being of the benzene or naphthalene series. Furthermore such dyestuffs are produced by condensing an isatine of our U. S. application Ser. No. 650,580 (II) or a reactive α-derivative thereof or a 2-derivative of the 2.3-diketo-dihydro - thionaphthene corresponding to the hydroxy-thionaphthenes described in our U. S. application Ser. No. 650,578 (I) with a hydroxy-thionaphthene of the benzene or naphthalene series.

Dyestuffs containing halogen may be prepared either by starting from halogen-containing materials or by an after-halogenation of the dyestuffs if the either of their components is still capable of being halogenized.

The dyestuffs thus prepared show different shades according to the position of the substituents and according to the second indigoid dyestuff component used. They are partially distinguished by a remarkable fastness.

Among the dyestuffs containing an isatine of our application II those of the benzene series representing the type 2-hydroxy-thionaphthene-2'-indol-indigo are of a particular importance. They dye violet to blue shades of a very good fastness to boiling together with an excellent fastness to water-dropping.

Whereas the known dyestuffs of the violet-series don't meet all requirements of practice (since those from halogenated isatines and hydroxy-thionaphthenes don't possess a fastness to boiling sufficient to all purposes and since the dyestuffs of the iso-dibenzanthrone-series possess a good fastness to boiling but only a moderate fastness to water-dropping), by the violet dyestuffs obtained according to the present invention the dyestuff-assortment hitherto known is remarkably completed.

In order to further illustrate our invention the following examples are given, the parts being by weight and all temperatures in centigrade degrees; but it is, however, to be understood that our invention is not limited to the particular products nor reacting conditions mentioned therein.

Example 1

10 parts of 6.7-dimethyl-5-methoxy-3-hydroxy-thionaphthene, described in Example 1 of our application I, are dissolved at 50° in 200 parts of caustic soda solution normal and 45 parts of alcohol and oxidized with an aqueous solution of 15 parts of ferric potassium cyanide. The dyestuff 5.5'-dimethoxy-6.7.6'.7'-tetra-methyl-thioindigo has a black-violet color, is easily vatting with a yellowish brown tint and dyes the vegetable fiber neutral gray shades of good fastness; it is also distinguished by a remarkable good fixation in printing. It corresponds to the following formula:

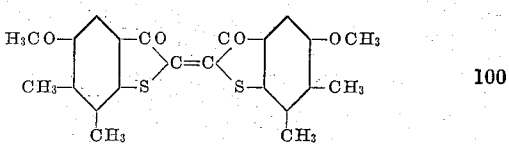

The symmetrical dyestuff which may be obtained in the same manner from the 1.2.4-xylidine-5-sulfonic acid after transforming it into the 4.5-dimethyl-7-methoxy-hydroxy-thionaphthene, dyes cotton from the vat greenish blue shades.

Example 2

5 parts of the 6.7-dimethyl-5-methoxy-hydroxy-thionaphthene, 6.6 parts of 2.1-naphthoxy-thiophene-anil and 120 parts of glacial acetic acid are heated while stirring to 115° during 5 hours. The separated dyestuff is filtered off by suction, dried and made to a paste by means of sulfuric acid. The product thus obtained dyes the fiber from a golden-yellow vat olive shades and corresponds to the following formula:

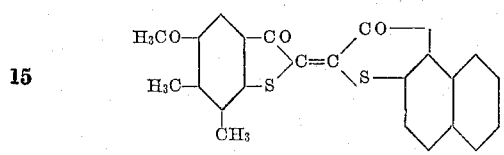

The dyeings are distinguished by an excellent fastness to light. The dyestuff may also be used for cloth-printing.

Example 3

25 parts of the 4.6-dimethyl-5-methoxy-hydroxy-thionaphthenes, described in Example 2 of our application I, 22 parts of 5.7-dichloro-isatine, 500 parts of glacial acetic acid and 0.12 parts of hydrochloric acid (specific gravity=1.19) are warmed to 115–120° while stirring under reflux for about 5 hours. The separated dyestuff is filtered off with suction and made to a paste by means of concentrated sulfuric acid. The product thus obtained forms a colorless vat and dyes cotton bright red shades of a remarkably good fastness. It corresponds to the following formula:

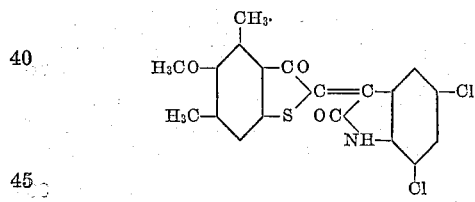

Example 4

46 parts of the 4.6-dimethyl-7-ethoxy-hydroxy-thionaphthene are dissolved at 80° in 500 parts of chlorobenzene and condensed at 85° with a solution of 4-methyl-5-chloro-7-methoxy-isatine-α-chloride, prepared at 100° from 50 parts of 4-methyl-5-chloro-7-methoxy-isatine, 52 parts of phosphorus pentachloride and 500 parts of chloro-benzene. The dyestuff forms a greenish yellow vat and dyes and prints cotton bright greenish blue shades of good fastness qualities. It corresponds to the following formula:

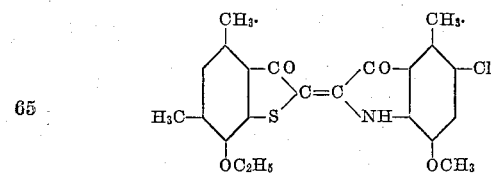

Example 5

45 parts of the 4.7-dimethyl-6-ethoxy-3-hydroxy-thionaphthene, described in Example 3 of our application I, are heated for some time with 55 parts of 2.3-diketo-dihydro-thionaphthene-2-(p-dimethyl-amino)-anil in 100 parts of glacial acetic acid. The scarlet dyestuff thus obtained corresponds to the following formula:

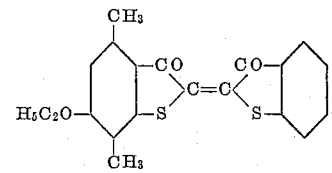

It dissolves in concentrated sulfuric acid with a black-violet color, forms a yellow vat and dyes cotton bright scarlet shades of good fastness. The dyestuff may also be used for cloth-printing.

Example 6

By oxidizing the sodium salt of the 4.5-dimethyl-6-methoxy-3-hydroxy-thionaphthene-2-carboxylic acid, described in Example 4 of our application I, in an alkaline solution with e. g. ferric potassium cyanide, the symmetrical dyestuff corresponding to the following formula:

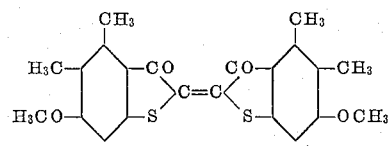

is obtained; it has an orange color and dissolves in sulfuric acid with a bluish violet tint.

Example 7

21 parts of the 4.5-dimethyl-6-methoxy-3-hydroxy-thionaphthene, described in Example 4 of our application I, are heated in 50 parts of glacial acetic acid with 32 parts of 6-methoxy-2.3-diketo-dihydro-thionaphthene-2-(p-dimethyl-amino)-anil. The dyestuff thus obtained corresponds to the following formula:

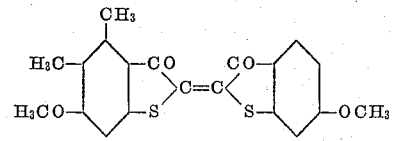

It dyes cotton from a yellow vat yellowish orange shades of remarkably good fastness to boiling and dissolves in concentrated sulfuric acid with a violet-blue color.

Example 8

4.6-dimethyl-5-chloro-7-methoxy-3-hydroxy-thionaphthene, described in Example 5 of our application I, is oxidized for instance according to Example 6. In this manner a reddish violet symmetrical thioindigo-dyestuff corresponding to the following formula:

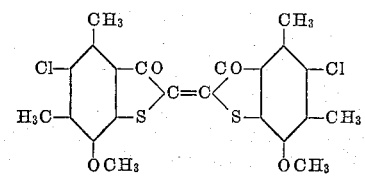

is obtained.

Example 9

35 parts of 4.5-benzo-2.3-diketo-dihydro-thionaphthene-2-(p-dimethyl-amino)-anil are heated to 100° for 4 hours with 24 parts of 4.6-dimethyl-5-chloro-7-methoxy-3-hydroxy-thionaphthalene and 50 parts of glacial acetic acid.

In this manner a dyestuff is obtained which corresponds to the following formula:

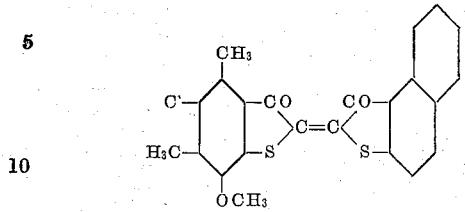

and which dyes cotton from an orange vat claret shades of good fastness qualities especially to light.

Example 10

The 4.7-dimethyl-5-chloro-6-methoxy-3-hydroyxy-thionaphthene, described in Example 6 of our application I, is dissolved in spirit of 30% strength with 1 molecule of caustic soda solution and oxidized with ferric potassium cyanide. The symmetrical thioindigo-dyestuff thus obtained corresponds to the following formula:

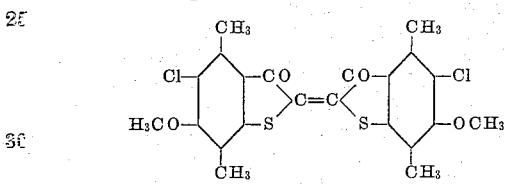

and dissolves in concentrated sulfuric acid with an olive-green color, dyeing cotton from a yellow vat bright reddish violet shades of good fastness.

The same symmetrical thioindigo-dyestuff may also be obtained by adding 1 part of the 1.4-dimethyl -2- chloro -3- methoxy-benzene-5-thioglycollic acid, described in Example 6 of the above said application) to 5–10 parts of chloro-sulfonic acid and precipitating by means of ice-water after some hours' standing at 10–20°.

Example 11

The symmetrical thioindigo obtained from the 4.7-dimethyl-5-methoxy -6- chloro - 3 - hydroxy-thionaphthene, described in Example 7 of our application I, has a reddish violet color and dissolves in concentrated sulfuric acid with a green tint.

By combining this hydroxy-thionaphthene with 2-anils of 2.3-diketo-dihydro-thionaphthenes or isatines dyestuffs of bright shades and good fastness qualities are obtained. The following table shows the properties of some dyestuffs obtained in this manner:—

| Combined with | Shade of the dyeing on cotton | Color of the vat | Color of the solution in concentrated sulfuric acid |
|---|---|---|---|
| 2.3 - diketo - dihydro - thionaphthene-2-anil. | Bluish red. | Yellow | Yellowish green |
| 4 - methyl - 6 - chloro - 2.3 - diketo - dihydro - thionaphthene-2-anil. | Bluish red. | Yellow | Green. |
| 6 - methoxy - 2.3 - diketo - dihydro - thionaphthene - 2-anil. | Scarlet | Yellow | Yellowish green |
| 5.7 - dichloro - isatine - α - chloride. | Violet | Golden-yellow. | Bluish green. |
| 4 - methyl - 5 - chloro - 7- methoxy - isatine - α - chloride. | Blue | Greenish yellow. | Green. |

Example 12

4 5-dimethyl-6-chloro-7-methoxy-3-hydroxy-thionaphthene of 132–133° melting point yields a symmetrical thioindigo which corresponds to the following formula:

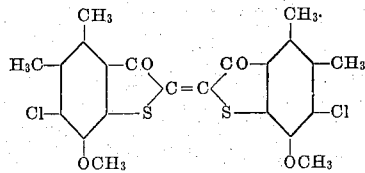

dyeing cotton reddish violet shades of a very good fastness to boiling and to chlorine.

The dyestuff obtained by combining the same hydroxy-thionaphthene with 4-methyl-6-chloro-2.3-diketo - dihydrothionaphthene - 2 - anil dyes cotton pink shades.

Example 13

28.7 parts of 4.7-dimethyl-5-methoxy-6-bromo-hydroxythionaphthene of 94° melting point, described in Example 8 of our application I, are heated with 33 parts of 4-methyl-6-chloro-2.3-diketo-dihydro-thionaphthene - 2 - (p-dimethylamino)- anil in 100 parts of glacial acetic acid. The dyestuff thus obtained corresponds to the following formula:

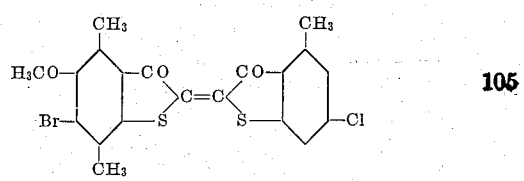

and dissolves in concentrated sulfuric acid with a green color and dyes from a yellow vat bluish red shades.

Example 14

29 parts of 4.7-dimethyl-5-methoxy-6-bromo-hydroxythionaphthene are dissolved in 300 parts of chloro-benzene and condensed with an isatine-α-chloride-solution, prepared from 25 parts of 4.6-dimethyl-5.7-dichloro-isatine, 22 parts of phosphorus pentachloride and 300 parts of chloro-benzene by heating to 95–100°. In this manner a dyestuff is obtained, corresponding to the following formula:

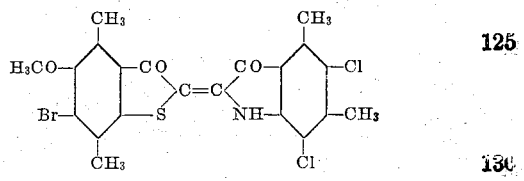

dyeing cotton from a yellow vat bright violet shades and dissolving in concentrated sulfuric acid with a green color.

Example 15

4 - chloro-5-methoxy-6.7-dimethyl-3-hydroxy-thionaphthene, described in Example 9 of our application I, is condensed with 4-methyl-6-chloro - 2.3 - diketo-dihydro-thionaphthene-2-(p-dimethyl-amino)-anil. In this manner a dyestuff is obtained which corresponds to the following formula:

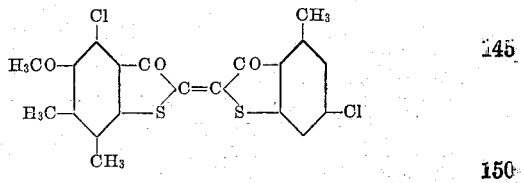

It dissolves in concentrated sulfuric acid with an olive-green color and dyes cotton from a yellow vat ruby-red shades of good fastness.

Example 16

23.9 parts of 5-chloro-4.6-dimethyl-7-methoxy-isatine, described in Example 1 of our application II, are heated in chloro-benzene with 21 parts of phosphorus pentachloride. The α-chloride thus obtained is condensed with 21.3 parts of 4.7 - dimethyl-5-chloro-3-hydroxy-thionaphthene. In this manner a dyestuff is obtained, corresponding to the following formula:

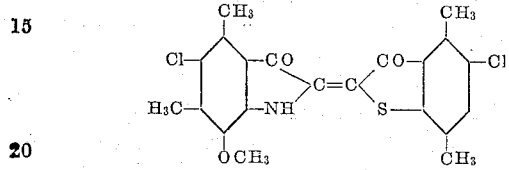

dyeing cotton from a yellow vat reddish blue shades of an excellent fastness to boiling and chlorine. The solution of this dyestuff in concentrated sulfuric acid has a blue-green tint.

When starting, instead of from the methylated, from the ethylated isatine and working in an analogous manner, the corresponding ethoxy-compound is obtained which is very similar as to its properties to the foregoing described methoxy-compound.

Example 17

24 parts of 6-chloro-4.7-dimethyl-5-methoxy-isatine, described in Example 2 of our application II, are transformed into the isatine-α-chloride by heating with 21 parts of phosphorus pentachloride in a solution of chloro-benzene. The α-chloride is condensed with 25 parts of 5. 6. 7-trichloro-3-hydroxy-thionaphthene. The dyestuff thus obtained corresponding to the following formula:

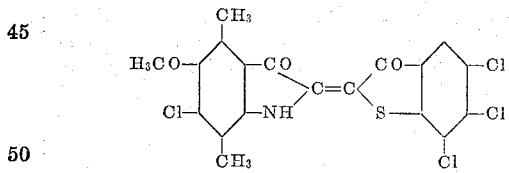

dissolves in concentrated sulfuric acid with a green color and dyes cotton from an orange vat bluish violet shades of good fastness to water-dropping.

Example 18

By condensing 5-methoxy-6.7-dimethyl-isatine, described in Example 3 of our application II, with 2.1-naphthoxy-thiophene an indirubine of an olive-brown color is obtained which corresponds to the following formula:

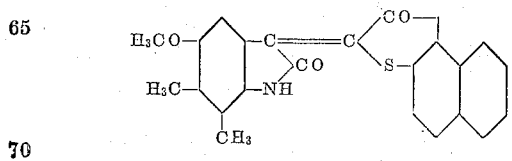

is obtained.

By condensation of the α-chloride of the 5-methoxy-6.7-dimethyl-isatine with 5. 6. 7-trichloro-hydroxy-thionaphthene a violet dyestuff is obtained.

Example 19

27 parts of 7-bromo-4.6-dimethyl-5-methoxy-isatine, described in Example 4 of our application II, 25 parts of phosphorus pentachloride and 200 parts of chloro-benzene are stirred at 100° for about 2 hours until the formation of a clear solution. The solution of the isatine-α-chloride is condensed at 85° with a solution of 23 parts of 4.7-dimethyl-5-chloro-3-hydroxy-thionaphthene in 400 parts of chloro-benzene. The dyestuff thus produced corresponds to the following formula:

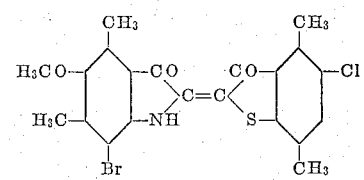

dissolves in concentrated sulfuric acid with a blue color and dyes cotton from a yellow vat bright bluish violet shades. The dyeings and printings are distinguished by their excellent fastness to soda-boiling and to water-dropping.

When using in this example instead of the α-chloride the α-anilide of the same isatine, the same dyestuff is obtained.

By treating these 7-bromo-4.6-dimethyl-5-methoxy-isatine-α-derivatives with 4-methyl-6-chloro-3-hydroxy-thionaphthene or with 4-methly-5.7-dichloro-3-hydroxy-thionaphthene violet dyestuffs, with 4-chloro-1-naphthol-a blue, with 1-chloro-2.3-naphtho-hydroxy-thiophene also a blue vat dyestuff of excellent fastness are obtained.

Example 20

By starting in the foregoing example from the corresponding chloro-substituted isatine and by condensation with 5.6.7-trichloro-3-hydroxy-thionaphthene a bright violet dyestuff of good fastness to boiling and to light is obtained; it corresponds to the following formula:

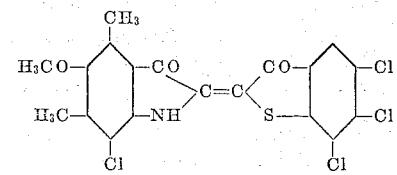

The α-derivative of the unhalogenated 4.6-dimethyl-5-methoxy-isatine yields e. g. with 4.7-dimethyl-5-chloro-3-hydroxy-thionaphthene a violet dyestuff of very good fastness.

4.7-dimethyl-5-chloro-6-methoxy-isatine yields with 5.6.7-trichloro-3-hydroxy-thionaphthene a violet dyestuff.

We claim:

1. The indigoid dyestuffs corresponding to the general formula

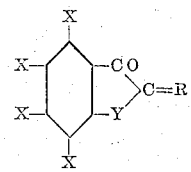

(wherein two X mean methyl, the third X an alkoxy-group, the fourth X hydrogen or halogen, Y means S or NH and R a radical of a hydroxy-thionaphthene or an isatine of the benzene or naphthalene series which may contain as substituents alkyl, alkoxy or halogen), which dyestuffs dye cotton from the vat various shades.

2. The indigoid dyestuffs corresponding to the general formula

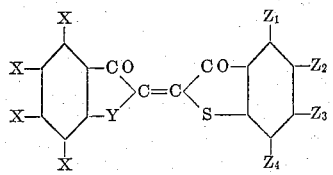

(wherein two X means methyl, the third X an alkoxy-group, the fourth X hydrogen or halogen, Y means S or NH, $Z_1$, $Z_2$, $Z_3$ and $Z_4$ mean hydrogen, alkyl, alkoxy or halogen), which dyestuffs dye cotton reddish violet to gray shades.

3. The indigoid dyestuff corresponding to the formula

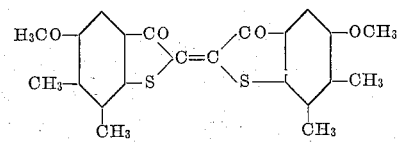

which dyestuff dyes cotton from the vat gray shades of a good fastness.

4. The indigoid dyestuff corresponding to the formula

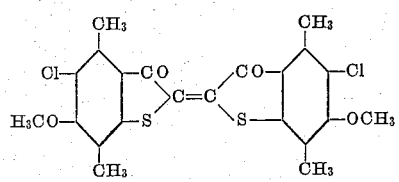

which dyestuff dyes cotton from the vat reddish violet shades of a good fastness.

5. The indigoid dyestuff corresponding to the formula

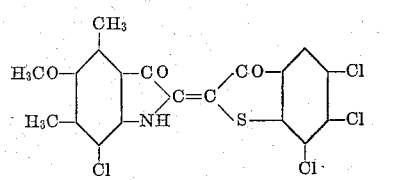

which dyestuff dyes cotton from the vat violet shades of a good fastness.

NORBERT STEIGER.
WALTER BRUNNER.